United States Patent [19]
Bull et al.

[11] Patent Number: 5,029,306
[45] Date of Patent: Jul. 2, 1991

[54] OPTICALLY FED MODULE FOR PHASED-ARRAY ANTENNAS

[75] Inventors: James G. Bull, Issaquah; Michael de La Chapelle, Bellevue, both of Wash.

[73] Assignee: The Boeing Company, Seattle, Wash.

[21] Appl. No.: 392,048

[22] Filed: Aug. 10, 1989

[51] Int. Cl.[5] .......................... H01Q 3/22; G02F 1/00
[52] U.S. Cl. .................................. 342/368; 342/371; 455/619
[58] Field of Search ........................ 342/368, 371-377; 455/619

[56] References Cited

U.S. PATENT DOCUMENTS

| | | | |
|---|---|---|---|
| 3,731,103 | 5/1973 | O'Meara | 342/370 |
| 3,878,520 | 4/1975 | Wright et al. | 342/368 |
| 4,028,702 | 6/1977 | Levine | 342/374 |
| 4,156,135 | 5/1979 | Miller, Jr. et al. | 455/619 |
| 4,258,363 | 3/1981 | Bodmer et al. | 342/368 |
| 4,661,786 | 4/1987 | Bender | 332/7.51 |
| 4,686,533 | 8/1987 | MacDonald et al. | 342/373 |

OTHER PUBLICATIONS

Giacoletto, L. J., "Radar Systems," *Electronics Designer's Handbook*, 2d Ed., 1977, pp. 26—2-26—5.

*Primary Examiner*—Gregory C. Issing
*Attorney, Agent, or Firm*—Christensen, O'Connor, Johnson & Kindness

[57] ABSTRACT

A phased-array antenna (14) is disclosed including modules (12) that respond to optic signals provided by a central processor (16) vai an optic feed network (18). In a transmit mode of operation, the central processor provides optic transmit signals to the modules, controlling the phase and attenuation of the various signals to accomplish the desired steering of the antenna beam produced by the array. A mixer or avalanche photodiode (42) in each module provides suitable optical-to-RF power conversion for the input signal to allow antenna elements (44) in the module to radiate the desired electromagnetic beam. During a receive interval, a received electric signal produced by the antenna elements is combined by the mixer with a local oscillator frequency optic signal applied to the mixer by the central processor. As a result, the RF frequency of the received signal is reduced to an IF frequency for low-cost amplification by an amplifier (52). A ligh source (48) then transmits the received signal back to the central processor for interpretation. The resultant arrangement advantageously reduces the complexity and expense of the various modules in the array.

22 Claims, 3 Drawing Sheets

OPTICALLY FED MODULE FOR PHASED-ARRAY ANTENNAS

FIELD OF THE INVENTION

This invention relates generally to phased-array antennas and, more particularly, to phased-array antennas including optically fed modules.

BACKGROUND OF THE INVENTION

The transmission of electromagnetic energy through a medium such as the atmosphere has numerous applications. Perhaps the most common is in the field of communications, where information is modulated onto the transmissions between a transmitter and receiver. Another example is radar, or radio direction and ranging, which involves the transmission of a pulse of radio frequency (RF) electromagnetic energy into the atmosphere and the subsequent reception and analysis of RF electromagnetic energy reflected by surrounding objects.

The primary device used to transmit and receive electromagnetic energy is the antenna. When an RF electric signal is applied to an antenna, RF electromagnetic energy is emitted by the antenna and will propagate through the atmosphere. Similarly, the antenna generates an RF electric signal as an output when it receives RF electromagnetic energy.

In many applications, it is desirable to scan the transmitted and received beams of electromagnetic energy. Traditionally, scanning was accomplished by mechanically rotating the antenna. Mechanical scanning arrangements are, however, relatively bulky, slow, and subject to mechanical failure.

As an alternative to mechanically rotatable antennas, phased-array antennas were developed including a plurality of transmit/receive (T/R) modules. Although the relative positions of the modules are mechanically fixed, the modules are electrically controlled to transmit and receive signals along a steerable beam. Specifically, by adjusting the phase and amplitude of the signals applied to, or received from, the various individual modules, the direction of the beam produced or received by the array as a whole can be controlled.

In active phased-array antennas, each module contains at least one antenna element, as well as components for amplifying the signals applied to, and received by, the antenna. Typically, these components also control the phase and amplitude of the signals to effect steering of the antenna beam. Thus, the modules may include amplifiers, phase shifters, circulators, switches, limiters, and other components and, as a result, are typically relatively complex and expensive.

To complete the radar system, the various modules included in the array are coupled to a central processing system. The central processing system generates the signals to be transmitted by the array and interprets the received signals to determine the range, direction, and identity of surrounding objects.

The signals are communicated between the modules and the central processing system by a corporate feed network. Traditionally, corporate feed networks included stripline, waveguide, or coaxial transmission lines to transmit electric signals to and from the modules. Such networks, however, are typically relatively heavy, bulky, and subject to the effects of internal electromagnetic interference (EMI) and external electromagnetic pulses (EMP). It has been discovered that the use of optical fibers in corporate-feed networks overcomes most of these disadvantages. Specifically, fiber-optic feeds are extremely lightweight, compact, and immune from the effects of EMI and EMP.

Fiber-optic feed networks are, however, not without problems. For example, the amount of power that can be optically transmitted by a fiber is typically much less than can be electrically transmitted by a stripline or coaxial transmission line. So, to be useful, an optically transmitted signal must be amplified at the module. As a result, the reduced weight, bulk, and expense of a fiber-optic feed network may be set off by the increased cost and complexity of each module. In view of these observations, it would be desirable to provide a relatively simple and inexpensive T/R module for use in an optically fed, phased-array antenna.

SUMMARY OF THE INVENTION

In accordance with this invention, a module is provided for use in a phased-array antenna. The module is responsive to input optic signals and is for use in transmitting electromagnetic energy and producing a received electric signal in response to received electromagnetic energy. A key element of the module is broadly referred to as a mixer and preferably is an avalanche photodiode. When the module is operated in a transmit mode, the mixer produces an input electric signal in response to the input optic signal. An antenna element responds to the input electric signal by transmitting electromagnetic energy.

In a receive mode of operation, the antenna element produces a received electric signal in response to received electromagnetic energy. The mixer then mixes the input optic signal and the received electric signal to produce an output electric signal.

During the transmit mode of operation, the input optic signal is modulated at a transmit frequency corresponding to the frequency of electromagnetic energy to be radiated by the antenna element. When the module is operated in the receive mode, the input optic signal is at a different, local oscillator frequency. The mixer combines this local oscillator signal with the received electric signal to produce an intermediate frequency output electric signal that can be amplified by relatively inexpensive circuitry.

In accordance with further aspects of this invention, the module includes a source for producing an output optic signal in response to the output electric signal produced by the mixer. The antenna element and mixer are also coupled by an antenna-coupling device, while the mixer and source are coupled by a source-coupling device. Optical transmission lines transmit the input optic signal to the mixer and the output optic signal from the source.

BRIEF DESCRIPTION OF THE DRAWINGS

The invention will presently be described in greater detail, by way of example, with reference to the accompanying drawings, wherein.

DETAILED DESCRIPTION OF THE PREFERRED EMBODIMENT

Figure 1:
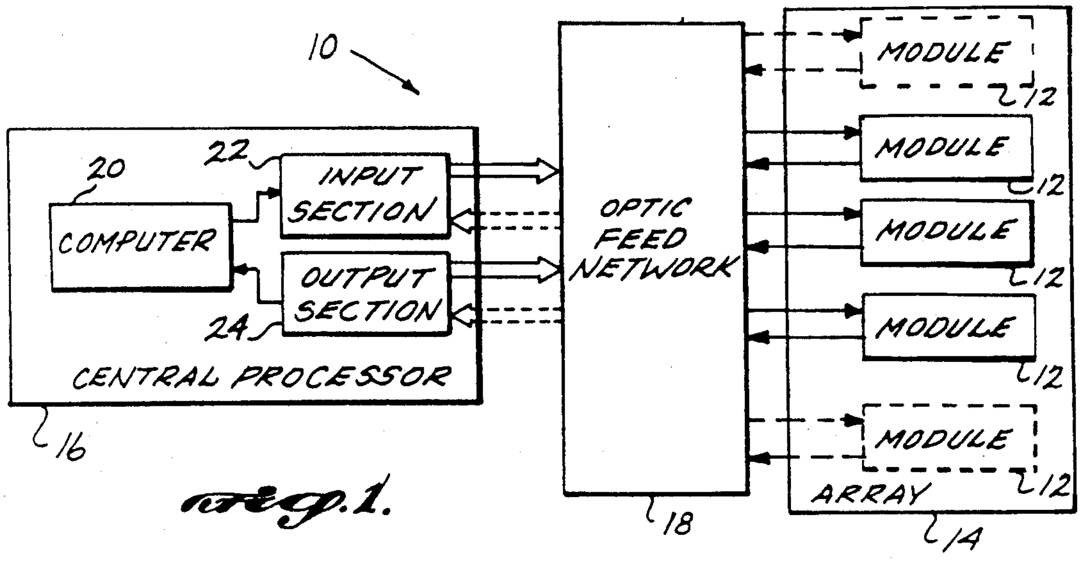
FIG. 1 is a block diagram of a phased-array antenna system, constructed in accordance with this invention and including a plurality of antenna modules coupled to a central processor by an optic feed network.

Referring now to FIG. 1, a system 10 is shown employing modules 12 constructed in accordance with this invention. As illustrated, the modules 12 cooperatively define a phased-array antenna 14 that transmits and/or receives electromagnetic energy. The operation of the array 14 is governed by a central processor 16, coupled to the various modules 12 by an optic feed network 18.

In one application, system 10 may be for use on an aircraft to allow the crew to communicate with remote transmission/reception sites, or to receive information concerning the range and direction of, for example, other aircraft. When the system 10 is operated in a transmit mode, a computer 20 in the central processor 16 causes an input section 22 of central processor 16 to produce radio frequency (RF) input optic signals at a transmit frequency $f_t$. The feed network 18 provides these RF input optic signals to the modules 12, which respond by transmitting the desired beam of electromagnetic energy. By controlling the phase and attenuation of the input optic signals supplied to the various modules 12, the computer 20 and input section 22 of central processor 16 are able to control the beam pattern of array 14.

In a receive mode of operation, the input section 22 of central processor 16 again provides input optic signals to modules 12, but this time at a local oscillator frequency $f_{lo}$. As will be described in greater detail below, the response of modules 12 can be thought of as including the production of input electric signals at the frequency $f_{lo}$. Each module 12 also produces an RF receive electric signal, having a frequency $f_r$, in response to electromagnetic energy reflected by surrounding objects and impinging upon the module 12.

The input and receive electric signals are then mixed by module 12 to produce an intermediate frequency (IF) electric signal, having a frequency $f_{if}$. Because the IF electric signal is considerably lower in frequency than the RF receive electric signal, it can more easily intensity-modulate an optical source for optical transmission by network 18 to an output section 24 of central processor 16.

The output section 24 combines the signals from the various modules 12 to produce a cumulative receive beam for array 14. By varying the phase and attenuation of the local oscillator signals that are transmitted to the various modules 12, the receive beam of the array 14 can be controlled. Computer 20 interprets this receive beam in view of the transmitted beam, to determine the range and direction of objects from which electromagnetic energy has been reflected and received.

As will be discussed in greater detail below, by employing a single device to detect the transmit frequency signals, as well as mix the receive and local oscillator frequency signals, the complexity and expense of module 12 is reduced. Further, by employing a single optic fiber in network 18 to provide the transmit and local oscillator frequency optic signals to each module 12, the transmit and receive antenna beams of array 14 can be controlled without auxiliary control lines. Further, because the phase adjustments and attenuation required to steer the antenna beams are performed by central processor 16, rather than modules 12, the complexity, bulk, and expense of each module 12 are relatively small.

Having reviewed the basic operation of system 10, its various components will now be discussed in greater detail. Addressing first the manner in which the central processor 16 produces the transmit frequency $f_t$ and local oscillator frequency $f_{lo}$ input optic signals applied to the various modules 12 in array 14, reference is had to FIG. 2. Briefly, computer 20 controls the operation of the input section 22 of central processor 16 to produce these optic signals. As shown, input section 22 includes a transmit source 26, which produces electric signals having a frequency $f_t$, and a local oscillator source 28, which produces electric signals having a frequency $f_{lo}$. In the preferred arrangement, both sources 26 and 28 synthesize signals from a single, stable crystal oscillator.

A switch 30, controlled by computer 20, connects the sources 26 and 28 to a power divider 32. When system 10 is operated in the transmit mode, computer 20 causes switch 30 to connect transmit source 26 to power divider 32. Alternatively, when the system 10 is operated in the receive mode, computer 20 causes switch 30 to connect the local oscillator source 28 to divider 32. Power divider 32 splits the electric signals produced by sources 26 and 28 into n separate signals for application to the n different modules 12 included in array 14. By separately controlling the attenuation and phase of these signals, the beam of antenna array 14 can be controlled as desired.

In that regard, the signals output by divider 32 are applied to n phase shifters 34. Each phase shifter 34 separately adjusts the phase of the electric signal received from divider 32 in response to commands from computer 20. Variable attenuators 36 then attenuate the outputs of the phase shifters 34 in response to further commands from computer 20.

By controlling the phase of the various transmit frequency $f_t$ signals, the beam of electromagnetic energy produced by antenna array 14 can be electronically steered by computer 20. Similarly, by controlling the phase of the local oscillator frequency $f_{if}$ signals, the direction of the received antenna beam can be steered. The transmitted and received antenna beams can be further tailored, and their side lobes reduced, by computer 20 via attenuation of the transmit and local oscillator frequency signals by the variable attenuators 36.

The electric signals processed by attenuators 36 are then applied to fiber-optic transmitters 38. Transmitters 38 modulate the transmit and local oscillator frequency electric signals onto optically incoherent signals to produce coherent, intensity-modulated, RF input optic signals at the transmit and local frequencies $f_t$ and $f_{lo}$, depending upon the present mode in which system 10 is operating. These input optic signals are applied to the various modules 12 by input optic fibers 40. A single fiber 40 conducts both the transmit and local frequency optic signals to each module 12.

Figure 3:
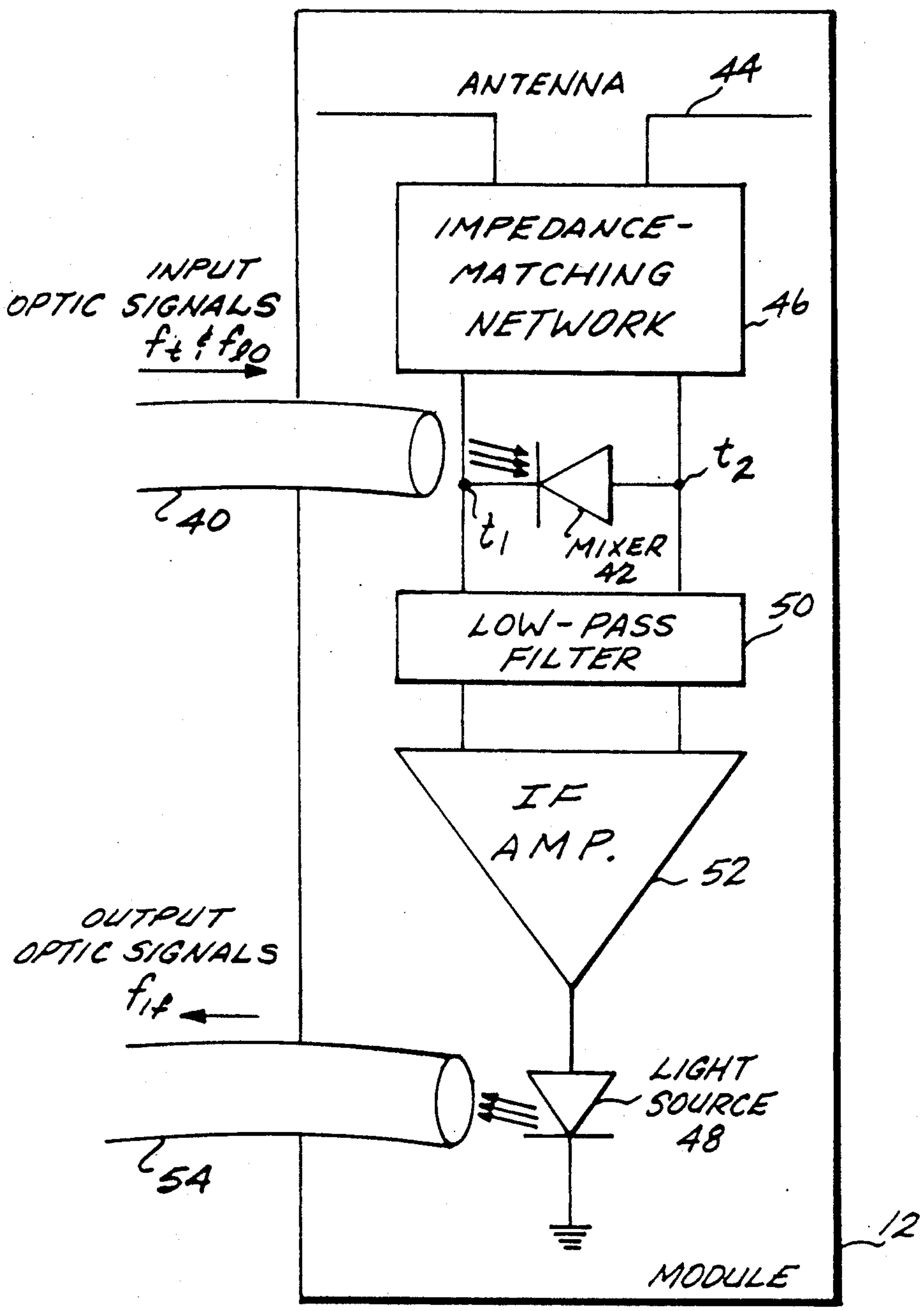
FIG. 3 is a schematic diagram of a preferred embodiment of an antenna module illustrated in FIG. 1.

Discussing now the manner in which module 12 processes the input optic signals, FIG. 3 provides a block diagram of one of the modules 12 included in array 14. As shown, the module 12 includes a mixer 42, antenna element 44, impedance-matching network 46, light source 48, low-pass filter 50, and amplifier 52. These various elements cooperatively transmit and receive electromagnetic energy in response to the input optic signals received from fiber 40.

As discussed in greater detail below, mixer 42 is a key element of module 12 and may be a PIN diode or, preferably, an avalanche photodiode. Avalanche photodiode 42 is a nonlinear device having two terminals t1 and t2. Avalanche photodiode 42 responds to input intensity-modulated optic signals from fiber 40 by producing input electric signals at the frequency of modulation.

When system 10 is in the transmit mode, the input optic signals are at the transmit frequency $f_t$ and photodiode 42 produces an electric signal of frequency $f_t$. Avalanche photodiode 42 acts as a power generator for this RF frequency signal, allowing the input optic signal to be simply and easily converted to an input electric signal suitable for transmission by antenna element 44.

This input electric signal is applied to antenna element 44 by the impedance-matching network 46, which has a passband that includes the frequency $f_t$ of the transmit signals. Although the terminals t1 and t2 of photodiode 42 are also coupled to the low-pass filter 50 during the transmit mode of operation, the signals produced by photodiode 42 are blocked by filter 50, which has a cutoff frequency well below the transmit frequency $f_t$.

As noted previously, in the transmit mode of operation, computer 20 applies control signals to the various phase shifters 34 and attenuators 36 in input section 22 to cause the modules 12 in antenna array 14 to cooperatively transmit a beam having the desired direction and pattern. Typically, these adjustments are made prior to the transmission of each pulse of electromagnetic energy, allowing the transmitted beam to be scanned.

After electromagnetic energy has been transmitted by the antenna elements 44 in modules 12, computer 20 may initiate a receive mode of operation in which the modules 12 await a receive signal. At the beginning of this interval, computer 20 actuates switch 30, causing the input optic signal applied to each photodiode 42 to be at the local oscillator frequency $f_{lo}$. The photodiode 42 responds by producing an input electric signal at its terminals t1 and t2 having the local oscillator frequency $f_{lo}$. Because the frequency $f_{lo}$ is outside the passband of network 40 and above the cutoff frequency of filter 50, the input electric signal is blocked by both components.

During this interval, reflected electromagnetic energy having a frequency $f_r$ that is substantially the same as $f_t$ may also be received by the antenna element 44. Antenna element 44 responds by producing receive electric signals having a frequency $f_r$. These signals are applied to the impedance-matching network 46, whose passband includes the signals' frequency $f_r$. As a result, the receive electric signals are applied to terminals t1 and t2 of photodiode 42.

The photodiode 42 effectively mixes the local oscillator input electric signal, produced in response to the input optic signal from fiber 40, with the receive electric signal from antenna element 44 to produce a mixed, IF beat frequency electric signal. The frequency $f_{if}$ of the mixed IF electric signal is equal to the difference between the receive and local oscillator frequencies $f_r$ and $f_{lo}$, respectively. The frequency $f_{if}$ of the mixed IF electric signal is outside the passband of network 46 and is, therefore, prevented from reaching antenna element 44. Because the frequency $f_{if}$ is below the cutoff frequency of low-pass filter 50, however, the mixed IF electric signal is applied to IF amplifier 52.

Amplifier 52 amplifies the mixed IF signal and, further, intensity-modulates the optic output of light source 48 with the mixed IF signal. As a result, light source 48, which is preferably a laser diode, produces an output optic signal that contains the information of the reflected electromagnetic energy but is lower in frequency. This output optic signal is transmitted back to central processor 16 by an output optic fiber 54.

By controlling the phase and attenuation of the local oscillator frequency $f_{lo}$ signals, computer 20 regulates the phase and amplitude of the mixed IF electric signals produced by the photodiodes 42 in the various modules 12. As a result, the receive antenna beam can be steered and tailored. With the output optic signals produced by the modules 12 combined in the manner described below, computer 20 thus controls the direction and pattern of the receive beam of antenna array 14.

The optic output signal transmitted from the modules 12 along output optic fibers 54 is input to n separate fiber-optic receivers 56 included in central processor 16. Each receiver 56 detects the IF frequency modulation on the optical carriers and produces an IF electric output signal in response. The electric output signals produced by the various receivers 56 are then summed in a combiner 58.

A detector 60 separates the summed output of combiner 68 into direct current, in-phase, and quadrature vector components. This is typically accomplished, in part, by comparing the summed output of combiner 58 with a reference IF signal produced by an IF oscillator 62. Preferably, the output of oscillator 62 is synthesized from the same crystal as sources 26 and 28 and has a reference frequency that is equal to the difference between $f_t$ and $f_{lo}$.

These analog in-phase and quadrature outputs produced by detector 60 are next applied to analog-to-digital (A/D) converters 64. The A/D converters 64 convert these analog outputs into digital signals for use by computer 20. Together, these digital in-phase and quadrature signals describe the beam received by array 14, mixed to a frequency $f_{if}$, as a vector quantity.

The computer 20 analyzes the magnitude and angle of the resultant beam defined by these vector components to determine, for example, the range and direction of objects reflecting electromagnetic energy to the array 14. Computer 20 also monitors the interval elapsed between the transmission and reception of electromagnetic energy by array 14 to determine the objects' range.

Figure 4:
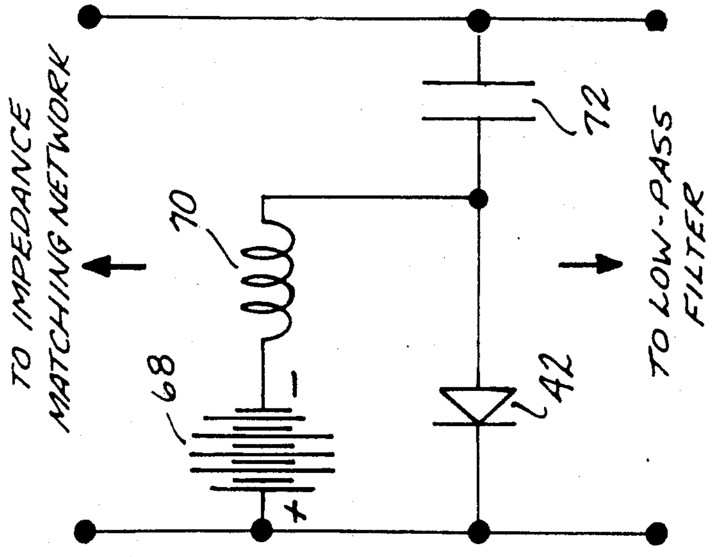
FIG. 4 is a schematic diagram of a first bias circuit included in the antenna module of FIG. 2.

While not shown in FIG. 3 for simplicity, bias circuits are also included in module 12 to operate photodiode 42 and laser diode 48. As shown in FIG. 4, the photodiode bias circuit 66 includes the series combination of a DC bias supply 68 and RF choke 70 connected in parallel with photodiode 42. A DC blocking capacitor 72 is further coupled between the positive terminal of photodiode 42 and the terminals of matching network 46 and filter 50.

Bias supply 68 is included to provide the bias voltage $V_o$ required to operate photodiode 42. The capacitor 72 prevents this DC bias voltage $V_o$ from interfering with the remaining RF portion of module 12. Similarly, choke 70 prevents the RF signals employed by the RF portion of module 12 from interfering with the operation of supply 68.

Figure 5:
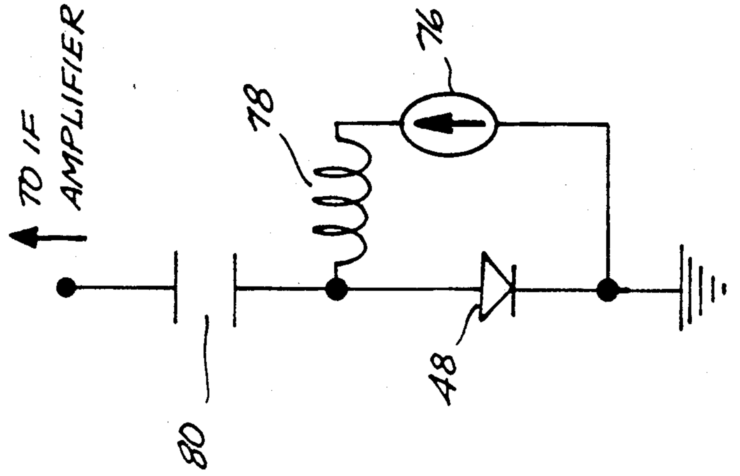
FIG. 5 is a schematic diagram of a second bias circuit included in the antenna module of FIG. 2.

In the laser diode bias circuit 74 shown in FIG. 5, the series combination of a current bias source 76 and RF choke 78 are connected in parallel with the laser diode 48. This parallel combination is, in turn, connected in series with a DC blocking capacitor 80. Source 76 is included to power the laser diode 48. In a manner similar to the components of circuit 66, choke 78 and capacitor 80 limit the flow of RF signals and DC signals to the bias source 76 and remainder of module 12, respectively.

Addressing the construction and operation of photodiode 42 in greater detail, as noted above, it operates as a generator of RF power when system 10 is operated in the transmit mode and as a hybrid mixer of RF electric signals and local oscillator frequency-modulated optic signals when system 10 is operated in the receive mode. In the preferred arrangement, avalanche photodiode 42 is a silicon device of the type manufactured by Mitsubishi under Part No. FU-24AP.

To help illustrate the operation of photodiode 42 as a power generator in the transmit mode, a quantitative example is provided. First, assume that the input optic signal received by photodiode 42 from fiber 40 has an optical power of 0.002 watt. With photodiode 42 having a sensitivity of 0.4 amp per watt and a maximum avalanche multiplication gain of 1000, the photocurrent produced by photodiode 42 in response to the input optic signal would be approximately 0.6 amp RMS. Assuming that the antenna element 44 has an impedance of 75 ohms and that a 5:1 impedance transformer is employed as the matching circuit 46, the load applied to photodiode 42 would be 375 ohms.

With a photodiode current of 0.6 amp RMS and a load of 375 ohms, the total power delivered to antenna element 44 by photodiode 42 would be 135 watts. This is the peak power radiated by antenna element 44 during the transmit interval. The average radiated power, however, is equal to the product of the peak power and the duty cycle of photdiode 42. Because most systems 10 operate at low duty cycles of one percent or less, the average transmitted RF power would be 1.35 watts or less.

As illustrated by this example, the power generated by photodiode 42 is significantly greater than the optical power received via fiber 40. To maximize the peak RF power available from photodiode 42, either the bias voltage applied to photodiode 42 or the optical power received by photodiode 42, or both, should be high during the transmit interval and then decreased during the receive interval for low power mixing. This can be accomplished by computer 20 by controlling the bias supply 68 or the fiber-optic transmitters 38. Even when properly controlled, the power dissipated by photodiode 42 might nevertheless destroy photodiode 42 unless substantial heat sinking is provided for the device.

The operation of photodiode 42 as a mixer in the receive mode of operation will now be discussed in greater detail. The voltage $V_{pd}$ across photodiode 42 in the receive mode of operation is equal to the mixed output of interest. This voltage $V_{pd}$ equals the sum of the bias voltage $V_o$ applied to the photodiode 42 by source 68, the voltage $V_r$ of the received electric signal from antenna element 44, and the voltage $V_{lo}$ produced by photodiode 42 in response to the local oscillator frequency optic signal. This relationship is expressed in equation form as:

$$V_{pd}=V_o+V_r+V_{lo} \qquad (1)$$

Describing the voltages $V_r$ and $V_{lo}$ in greater detail, if the received voltage $V_r$ is a sinusoidal voltage having a frequency $f_r$ and maximum magnitude of $V_{ro}$, the received voltage $V_r$ can be expressed as:

$$V_r=V_{ro}\sin(w_rt) \qquad (2)$$

In addition, the current $I_{pd}$ produced by photodiode 42 is equal to the product of the power $P_{op}$ of the optic signal received by the photodiode 42, the responsivity R of photodiode 42 to the optic signal, and the gain M of photodiode 42. As a result, the voltage $V_{lo}$ produced by the local oscillator frequency optic signal can be expressed in equation form as:

$$V_{lo}=R_1(I_{pd})=R_1(MRP_{op}) \qquad (3)$$

where $R_1$ is the load resistance applied to photodiode 42 at the local oscillator frequency. The load resistance $R_1$ is quite large given the high impedance of matching network 46 and low-pass filter 50 to signals at the local oscillator frequency $f_{lo}$.

Recognizing that the multiplication gain M can be expressed as a power series of the voltage at the terminals of photodiode 42, and by substituting equations (2) and (3) into equation (1), the voltage $V_{pd}$ at the terminals of photodiode 42 can be expressed as:

$$V_{pd}=V_o+V_{ro}\sin(\omega_rt)+R_1MRP_{opo}\sin(\omega_{lo}t) \qquad (4)$$

As will be appreciated from equation (4), $V_{pd}$ is a signal having an IF beat frequency equal to the difference between $f_r$ and $f_{lo}$. Thus, photodiode 42 has effectively mixed the received electric signal and local oscillator optic signal to produce a voltage at its terminals t1 and t2 having a frequency equal to $f_r-f_{lo}$.

In selecting the photodiode 42 to be used, it should also be noted that some tradeoff is experienced between the noise inherent in the avalanche process and the desire for a very nonlinear M-V curve. Noise can be minimized by choosing a material, such as silicon, with a small ratio of hole-to-electron impact ionization coefficients. On the other hand, a more nonlinear and, hence, more efficient mixer is produced by employing materials having a large ratio of hole-to-electron impact ionization coefficients.

Figure 2:
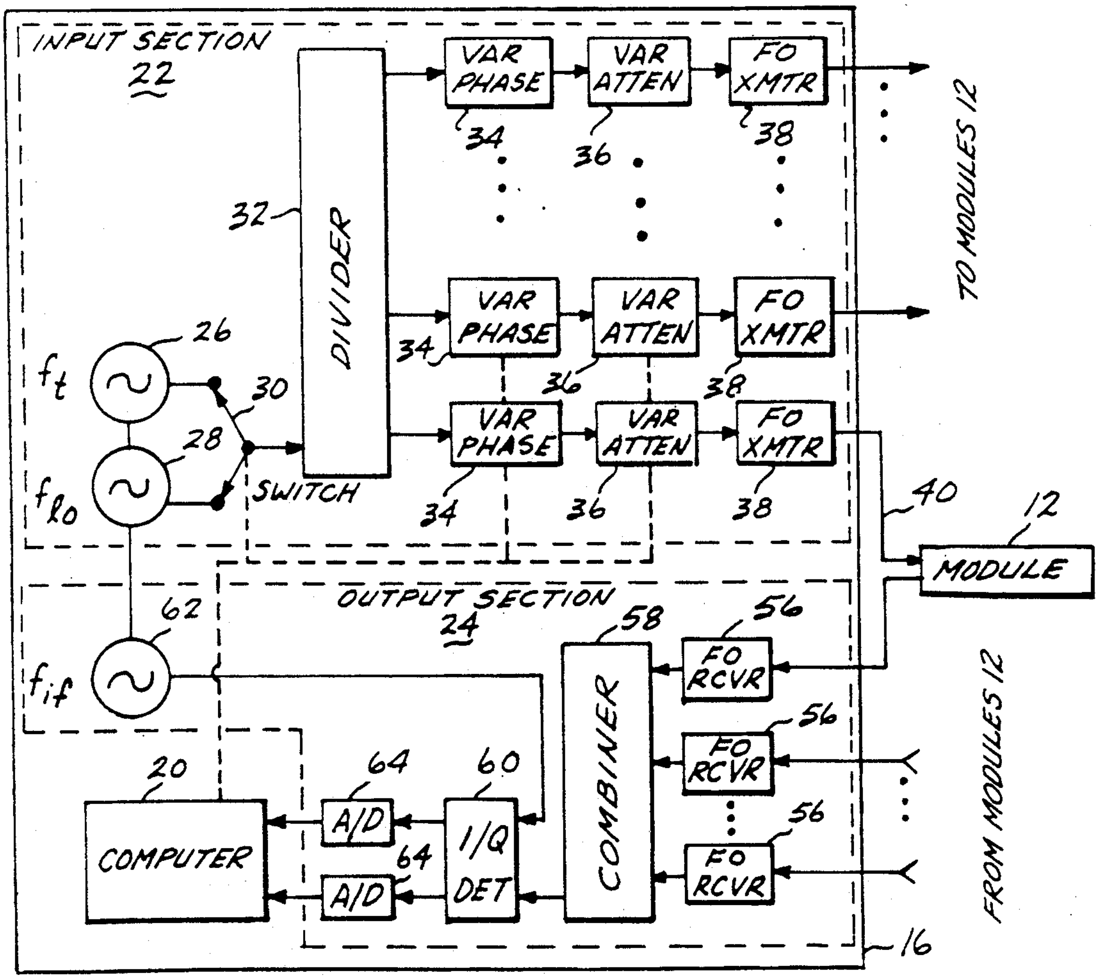
FIG. 2 is a schematic diagram of a preferred embodiment of the central processor illustrated in FIG. 1.

As will be appreciated, alternative arrangements can be employed for the central processor 16 illustrated in FIG. 2. For example, the output of the laser diode 48 in each module 12 could be applied directly to an A/D converter included in each module 12. In such an arrangement, the output of laser diode 48 would then be digitally transmitted along optical fiber 54 to central processor 16 for digital beam forming by computer 20.

The primary advantage of this approach is that it allows low-cost LEDs to be used in place of the laser diodes 48. More particularly, when analog data is transmitted along the optic fiber, its levels must be precisely controlled to preserve the information content of the data. Hence, a precision source such as laser diode 48 is required. When digital data is transmitted, however, greater source variations can occur without adversely affecting transmission accuracy. The problem with this approach, however, is that the power consumption and complexity of each module 12 increase due to the inclusion of the A/D converter.

As noted above, a system 10 constructed in the preceding manner has a number of advantages over the prior art. First, the mixer 42 allows optic input signals to be used to reduce the frequency of the RF received signals to an IF frequency. As a result, low-frequency amplifiers employing, for example, silicon transistors can be used in place of more expensive amplifiers required for use with RF signals. In addition, by combining a transmission power-generating device and a reception-mixing device into a single component, the number of elements required to accomplish these functions is reduced. Further, because the mixer 42 responds to signals from a single fiber, additional digital control lines are not required. Finally, by phase shifting and attenuating the signals in the central processor, rather than the modules, the cost and complexity of the array are reduced.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with digital or analog transmission of signals between the central processor and antenna array. Further, it will be recognized that the system may be designed only to transmit or receive signals and may be constructed for use in a variety of other applications including communications or navigation. Because of the above and numerous other variations and modifications that will occur to those skilled in the art, the following claims should not be limited to the embodiments illustrated and disclosed herein.

The embodiments of the invention in which an exclusive property or privilege is claimed are defined as follows:

We claim:

1. A module, responsive to local and transmit input optic signals, for use in receiving and transmitting electromagnetic energy, said module comprising:

antenna means for producing a receive electric signal in response to received electromagnetic energy; and an optoelectronic device for producing a local input electric signal in response to the local input optic signal and a transmit input electric signal in response to the transmit input optic signal and for mixing the local input electric signal and the receive electric signal to produce an output electric signal, said antenna means further being for transmitting electromagnetic energy in response to the transmit input electric signal.

2. A module, responsive to an input optic signal, for use in receiving electromagnetic energy, said module comprising:

antenna means for producing a receive electric signal in response to received electromagnetic energy; and an optoelectronic device for producing an input electric signal in response to the input optic signal and for mixing the input signal and the receive electric signal to produce an output electric signal, said optoelectronic device including a single pair of terminals, the receive electric signal being applied to the single pair of terminals and the output electric signal being produced at the single pair of terminals.

3. A module, responsive to an input optic signal, for use in receiving and transmitting electromagnetic energy, said module comprising:

antenna means for producing a receive electric signal in response to received electromagnetic energy;

an optoelectronic device for producing an input electric signal in response to the input optic signal and for mixing the input electric signal and the receive electric signal to produce an output electric signal, said antenna means further being for transmitting electromagnetic energy in response to the input electric signal; and source means for producing an output optic signal in response to said output electric signal.

4. The module of claim 3, further comprising antenna-coupling means, coupling said optoelectronic device to said antenna means, for providing said input electric signal to said antenna means when said module is for use in transmitting electromagnetic energy and for blocking said input electric signal when said module is for use in receiving electromagnetic energy.

5. The module of claim 4, further comprising source-coupling means, coupling said optoelectronic device to said source means, for providing the output electric signal to said source means and for blocking the input electric signal and the receive electric signal.

6. The module of claim 5, wherein the input optic signal and the input electric signal have a local frequency when electromagnetic energy is to be received by said module and a transmit frequency when electromagnetic energy is to be transmitted by said module.

7. The module of claim 6, wherein the receive electric signal has a receive frequency and wherein the output electric signal has an output frequency that is equal to the difference between the receive and local frequencies.

8. The module of claim 7, further comprising optical transmission means for transmitting the input optical signal to said optoelectronic device and the output optical signal from said source means.

9. The module of claim 8, wherein said optoelectronic device comprises an avalanche photodiode.

10. The module of claim 9, wherein said source means comprises a laser diode.

11. The module of claim 10, further comprising bias circuit means for operating said avalanche photodiode and said laser diode.

12. The module of claim 11, wherein said antenna-coupling means comprises an impedance-matching circuit having a passband that includes the transmit and receive frequencies but excludes the local frequency.

13. The module of claim 12, wherein said source-coupling means comprises a filter having a passband that includes the output frequency but excludes the transmit, local, and receive frequencies.

14. A phased-array antenna, operable in transmit and receive modes, comprising:

processing means for producing an input optic signal and for processing an output optic signal;

antenna means for transmitting electromagnetic energy in response to said input optic signal when said antenna is operated in said transmit mode and for producing a receive electric signal in response to received electromagnetic energy;

an optoelectronic device for mixing the receive electric signal with said input optic signal to produce the output optic signal when said antenna is operated in said receive mode; and optical transmission means, coupled to said processing means and said antenna means, for providing the input optic signal to said antenna means and the output optic signal to said processing means.

15. The phased-array antenna of claim 14, wherein said optoelectronic device is for producing an input electric signal in response to the input optic signal and for mixing the input electric signal and the receive electric signal to produce the output electric signal and said antenna means comprises:

antenna element means for producing the receive electric signal in response to received electromagnetic energy and for transmitting electromagnetic energy in response to the input electric signal; and source means for producing an output optic signal in response to said output electric signal.

16. The phased-array antenna of claim 15, wherein said optoelectronic device, antenna element means, and source means define a module, said phased-array antenna comprising a plurality of said modules.

17. The phased-array antenna of claim 16, wherein said processing means further comprises:

oscillator means for producing an oscillator electric signal having a transmit frequency when said antenna is operated in said transmit mode and a local frequency when said antenna is operated in said receive mode;

phase shift means for controlling the phase of the oscillator electric signal; and optic feed means for producing the input optic signal in response to the oscillator electric signal.

18. The phased-array antenna of claim 17, wherein said processing means further comprises:

electric feed means for producing an output electric signal in response to said output optic signal; and in-phase and quadrature detection means for producing in-phase and quadrature detection signals in response to said output electric signal.

19. A method of operating an antenna, having controllable reception and transmission characteristics, comprising the steps of:

producing a receive electric signal in response to electromagnetic energy received by the antenna;

producing a local input optic signal;

mixing the local input optic signal and the receive electric signal in a single device to produce an output signal, the output being indicative of the receive electromagnetic energy, and the local input optic signal controlling the reception characteristics of the antenna;

producing a transmit input optic signal for controlling the transmission characteristics of the antenna; and converting the transmit input optic signal into a transmit input electric signal in the single device for use by the antenna in transmitting electromagnetic energy.

20. The method of claim 19, further comprising the steps of controlling the phase and attenuation of the local and transmit input optic signals to control the reception and transmission characteristics of the antenna.

21. The method of claim 20, wherein the step of mixing the local input optic signal and the received antenna electric signal is performed by an avalanche photodiode.

22. The method of claim 20, further comprising the step of transmitting the local input optic signal and transmit input optic signal through a single optic fiber.

* * * * *

UNITED STATES PATENT AND TRADEMARK OFFICE
CERTIFICATE OF CORRECTION

PATENT NO. : 5,029,306
DATED : July 2, 1991
INVENTOR(S) : J. G. Bull et al.

It is certified that error appears in the above-identified patent and that said Letters Patent is hereby corrected as shown below:

| COLUMN | LINE | |
|---|---|---|
| 9 (Claim 2, | 52 Line 9) | after "input" insert --electric-- |
| [57] | 4 | "vai" should be --via-- |
| [57] | 19 | "ligh" should be --light-- |

Signed and Sealed this

Second Day of March, 1993

*Attest:*

STEPHEN G. KUNIN

*Attesting Officer*

*Acting Commissioner of Patents and Trademarks*